United States Patent Office 3,420,916
Patented Jan. 7, 1969

3,420,916
**PYROLYZED BLEND OF POLYETHYLENE
AND POLYPROPYLENE**
Gordon Y. T. Liu, Plaquemine, and Carl P. Strange,
Addis, La., assignors to The Dow Chemical Company, Midland, Mich., a corporation of Delaware
No Drawing. Filed Oct. 4, 1965, Ser. No. 492,896
U.S. Cl. 260—897                                10 Claims
Int. Cl. C08f 29/12

---

ABSTRACT OF THE DISCLOSURE

A process for the preparation of hollow shaped articles from a pyrolyzed blend of polyethylene with a minor amount of polypropylene is described. The process for the preparation of the pyrolyzed blend is also described. Generally, 70 to 95 percent by weight of polyethylene is blended with 5 to 30 percent by weight of polypropylene in a conventional mixer, then heated to a temperature of 250° to 450° C. in the absence of air for a period of time of 1–10 minutes. The pyrolyzed blend is then extruded as a tube, constricted at one end, and inflated so as to make it conform to a predetermined shape, i.e. the surrounding mold.

---

This invention relates to the molding of polyethylene and more particularly to the preparation of a modified polyethylene material for the production of hollow shaped articles.

The manufacture of bottles and similar hollow articles by a process involving the extrusion of a tube or parison of a plastic material and while still in plastic condition constricting the tube at one end and inflating the parison into conformity with a surrounding mold is well known to the art and is commonly referred to as blow molding.

It is also well known to the art that when a polymer is extruded from a die orifice there is a tendency for the polymer to "swell," that is, the dimension of the extrudate in a direction normal to the direction of movement of the extrudate will be somewhat greater than the comparable dimension of the die orifice.

In the case of extrusion of a polymer using a die having annular orifice, such as used in blow molding to form a parison extrudate, one effect of the swell properties of the polymer is that for a given annular orifice, the thickness of the parison wall will be substantially dependent on the swell properties of the polymer, i.e. parisons having increased wall thickness will be produced from polymers having increased swell properties.

The thickness of the parison wall is directly proportional to the structural strength of the hollow article produced. The structural strength of plastic bottles and particularly those formed from polyethylene is an important factor in the successful use of such bottles as containers for bleaches, detergents, fruit juices and various powdered materials.

Included in the methods commonly employed to increase the wall thickness of the parison is the use of a high molecular weight resin for the adjustment of the blow molding equipment to increase the degree of swell of the extrudate.

The use of a higher molecular weight resin causes extrusion problems, primarily high pressure requirements, high temperatures and reduced extrusion rates.

Adjustment of the blow molding equipment is time consuming and therefore uneconomical.

In accordance with the present invention polyethylene having increased swell suitable for blow molding is obtained by a process which comprises preparing a blend of about 70 to 95 percent by weight of a polyethylene having a density between about 0.95 to about 0.98 and a melt index between about 0.1 to about 1.5 and about 5 to about 30 percent by weight of polypropylene having a melt index between about 0.3 to about 10.0, heating the blend to a temperature between about 250° to about 450° C. for a time sufficient to produce a pyrolyzed product having a melt index in the range from about 0.2 to about 5 and higher than that of the blend before pyrolysis, and then recovering the pyrolyzed product.

The blending of the polyethylene with the polypropylene can be done by malaxing, kneading, milling or otherwise blending the materials together in any convenient order in the desired proportions as by compounding the materials in a Waring Blendor, internal mixer such as a mixing extruder or a Banbury-type mixer, or on an external mixer such as an open-faced roll mill such as a rubber mill thereby to form intimately blended compositions.

The pyrolysis of the polymer blend is accomplished by heating the blend in an inert atmosphere, such as nitrogen at a temperature between about 250° C. and about 450° C. and preferably in the range of 300° C. to 400° C. The pyrolysis can be operated as a batch or continuous process. When the latter method is employed, a long tubular cracking zone can be provided with a suitable heating means. The polymer blend is introduced at one end of the pyrolysis zone and an outlet is provided at the opposite end for extrusion of the product. The temperature and residence time, generally of about 1 to 10 minutes, controls the type of product obtained. The longer the heat is applied and the higher the temperature, the higher is the melt index of the product.

One suitable continuous means to carry out the pyrolysis is the use of a screw extruder, with approximate control of the speed at which the mass passes through the apparatus to insure that each successive portion of the polymer is degraded to the same extent at the temperature employed.

When a screw extruder is employed, the polyethylene/polypropylene blend having an initial melt index of about 0.1 to about 3 is introduced to a preheating zone in the extruder wherein the blend is preheated, usually to between about 130 to 175° C. Following preheating, the polymer blend is passed through the extruder wherein the temperature is further increased to about 250° to about 450° C. and then into a pyrolysis zone wherein mild cracking or vis-breaking of the polymer takes place. The temperatures employed in this zone are within the ranges hereinbefore set forth. The pyrolyzed polymer blend upon leaving the pyrolysis zone is then passed to a cooling zone wherein the temperature is substantially reduced, usually to between about 150 to 175° C. and at this temperature is extruded from the extruder.

The resultant pyrolyzed blend possesses a high degree of swell, and is readily processable by standard extrusion-blow molding techniques into hollow rigid articles such as bottles having excellent structural strength.

The present invention is illustrated by reference to the following examples which are meant to be illustrative only and not limiting in any respect.

EXAMPLE 1

An intimate blend consisting of 88 percent by weight of a linear polyethylene having a melt index of 0.70 (ASTM D–1238–62T) and a density of 0.960 and 12 percent by weight polypropylene having a melt index of 1.6 was prepared in a Waring Blendor.

The polyethylene/polypropylene blend was charged to a commercial plastics extruder comprising a tube containing a ¾" screw encompassed within a heating jacket divided into four separate heating sections or zones. The first zone in which the polymer was melted was heated to 130° C. The temperature of the second zone was 175° C.

The temperature of the third zone was varied from 300° C. to 350° C. to maintain the melt index of the extrudate between 1.0 to 1.5. The polymer was then cooled in the fourth zone and extruded from the die orifice at 175° C. at the rate of 10 to 15 grams/minute.

The resulting pyrolyzed polymer blend was allowed to cool to room temperature and then fed to a conventional bottle blowing apparatus whereby the polymer was blown to ½ gallon bleach bottles measuring 4½ inches in diameter and 10 inches in length. The bottle was then weighed and had a weight of 94 grams.

Bottle weight is used as a comparative determiner of the structural strength of the bottle, i.e. if two bottles of the same size, uniformly formed from the same polymer resin have different weights, the bottle having the greater weight will have the greater structural strength.

For purposes of comparison a bottle blown from the same polyethylene used above which was pyrolyzed in an identical manner had a weight of 68 grams.

EXAMPLE 2

The procedure of Example 1 was repeated to prepare 95/5 and 70/30 polyethylene/polypropylene blends. The blends were pyrolyzed and blown into bottles in a manner identical to Example 1. The weights of the bottles blown from these blends were 80 grams and 110 grams respectively.

EXAMPLE 3

A series of blends was prepared using a polyethylene having a melt index of 0.92 and a density of 0.96 and the polypropylene of Example 1. The blends were pyrolyzed and blown into bottles in a manner identical to Example 1. The weights of the bottles blown from the different blends are recorded in the table below.

For purposes of comparison, it was attempted to blow bottles by this procedure from polyethylene used in Example 3 pyrolyzed in a similar manner but to which no polypropylene had been added. The results of these comparative runs (sample numbers A and B) are also recorded in the table below.

TABLE

| Sample No. | Blend composition (percent by weight) | | Melt index of blend | Bottle wt. (g.) |
| --- | --- | --- | --- | --- |
| | Polyethylene | Polypropylene | | |
| 1 | 88 | 12 | 3.0 | 76 |
| 2 | 70 | 30 | 4.0 | 68 |
| 3 | 80 | 20 | 4.0 | 54 |
| A | 100 | | 4.0 | (¹) |
| B | 100 | | 3.0 | (¹) |

¹ Bottle could not be blown.

What is claimed is:

1. A process for preparing a polyethylene composition having increased swell on extrusion through an orifice which comprises preparing a blend of from about 5 to about 30 percent of a polypropylene having a melt index between about 0.3 and about 10 with about 70 to 95 percent by weight of a polyethylene having a melt index between about 0.1 and about 1.5 and a density between about 0.95 and about 0.98, heating said blend to a temperature between about 250° to about 450° C. for a time sufficient to produce a pyrolyzed product having a melt index between about 0.2 and about 5 and higher than that of the blend before heating and recovering the pyrolyzed product.

2. The process of claim 1 wherein the blend is pyrolyzed at a temperature between about 300° and 400° C.

3. The process of claim 1 wherein the pyrolyzed blend has a melt index between 1 and about 4.

4. The process of claim 1 wherein the polyethylene has a density of about 0.96.

5. The process of claim 1 wherein the polypropylene has a melt index of about 1.6.

6. A process for preparing a polyethylene composition having increased swell on extrusion and extruding hollow shaped articles therefrom which comprises preparing a blend of from about 5 to about 30 percent of a polypropylene having a melt index between about 0.3 and about 10 with about 70 to 95 percent by weight of a polyethylene having a melt index between about 0.1 and about 1.5 and a density between about 0.95 and about 0.98, heating said blend to a temperature between about 250° and about 450° C. for a time sufficient to produce a pyrolyzed product having a melt index between about 0.2 and about 5 and higher than that of the blend before heating, extruding said product as a parison, constricting said parison at one end thereof and inflating said parison to conform to a predetermined shape whereby a hollow shaped article is obtained.

7. The process of claim 6 wherein the blend is pyrolyzed at a temperature between about 300° and 400° C.

8. The process of claim 6 wherein the pyrolyzed blend has a melt index between 1 and about 4.

9. The process of claim 6 wherein the polyethylene has a density of about 0.96.

10. The process of claim 6 wherein the polypropylene has a melt index of about 1.6.

References Cited

UNITED STATES PATENTS

| 3,299,181 | 1/1967 | Coover et al. | 260—897 |
| 3,121,070 | 2/1964 | Coover et al. | 260—897 |
| 3,137,672 | 6/1964 | Lehane | 260—897 |
| 3,230,288 | 1/1966 | Henderson | 260—897 |
| 3,254,139 | 5/1966 | Anderson et al. | 260—897 |

FOREIGN PATENTS

| 830,827 | 3/1960 | Great Britain. |
| 858,674 | 1/1961 | Great Britain. |
| 990,273 | 4/1965 | Great Britain. |

SAMUEL H. BLECH, *Primary Examiner.*

C. J. SECCURO, *Assistant Examiner.*